United States Patent Office 3,728,313
Patented Apr. 17, 1973

3,728,313
ARYLENE SULFIDE POLYMER COATING COMPOSITION
Harold Wayne Hill, Jr., and James T. Edmonds, Jr., Bartlesville, Okla., assignors to Phillips Petroleum Company
No Drawing. Original application July 25, 1969, Ser. No. 845,098. Divided and this application Oct. 12, 1971, Ser. No. 188,492
Int. Cl. C08g 23/00
U.S. Cl. 260—79                                      8 Claims

ABSTRACT OF THE DISCLOSURE

Adherent coatings of arylene sulfide polymers are formed by applying a mixture of the polymer and an oxide or sulfide of cobalt or molybdenum to a solid substrate such as iron, steel, aluminum and ceramic.

---

This is a divisional of copending application Ser. No. 845,098 filed July 25, 1969, now Pat. No. 3,652,327.

This invention relates to an improved coating composition of an arylene sulfide polymer.

Arylene sulfide polymers are ideally suited for coatings of a wide variety of articles because of the high temperature stability of such polymers and their ability to withstand chemical attack. These polymers are particularly well suited for coating equipment such as pump impellers, agitator blades, valve parts and the interior of conduits which are used in handling corrosive fluids. These polymers also have great potential in the coating of various items of cookware such as baking pans, skillets, and the like, because food does not stick to the cured polymeric surface. In this regard, the high melting arylene sulfide polymers can be used in most coating applications where polytetrafluoroethylene is employed.

Because of the durability of coatings of arylene sulfide polymers, it is highly desirable to be able to subject them to conditions which are much more severe than are normally encountered by polymeric coatings. For example, it is desirable to be able to apply these coatings to pipe vessels and other equipment which contacts corrosive materials at high temperatures. Although the polymer itself can withstand severe conditions, it is difficult to develop a bond between polymer and the substrate which will be equally as resistant to attack. It has been the subject of considerable research, therefore, to find methods of improving the bonding of coatings of arylene sulfide polymers to substrates which are to be protected. One of these methods which has been highly successful has involved the incorporation of titanium dioxide into the coating composition. This improvement is described in the copending application of Tieszen and Edmonds, Ser. No. 752,809 filed Aug. 15, 1968, now Pat. No. 3,622,376.

We have now found that even better coatings of arylene sulfide polymers can be formed by incorporating into the coating an oxide or sulfide of cobalt or molybdenum. Coatings containing these materials have been found to be even superior to the coatings containing titanium dioxide.

It is an object of our invention to provide an improved coating of an arylene sulfide polymer. Other objects, advantages and features of our invention will be apparent to those skilled in the art from the following disclosure and claims.

The term "arylene sulfide polymer" as used in this specification is intended to include polymers of the type which are prepared as described in U.S. Pat. 3,354,129, issued Nov. 21, 1967, to Edmonds and Hill. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in the coating procedure of this invention, because of their high thermal stability and availability of the materials from which they are prepared, are those polymers having the repeating unit —R—S— where R is phenylene, biphenylene, naphthylene, biphenylene ether or a lower alkyl substituted derivative thereof. By "lower alkyl" is meant alkyl groups having 1 to 6 carbon atoms such as methyl, propyl, isobutyl, n-hexyl, and the like. The preparation of such polymers is quite well disclosed in the above patent of Edmonds et al.

The polymers which are used for coatings in this invention are preferably those which have melting temperatures above about 400° F. These arylene sulfide polymers can have a melting temperature anywhere in the range from 400 to 900° F. Polymers of phenylene sulfide normally have melting temperatures in the range from about 550 to 900° F. The preferred polymers have an inherent viscosity in chloronaphthalene at 206° C. of at least 0.1, more preferably between 0.1 and 0.3 and ideally between 0.13 and 0.23, as such polymers have been found to form very adherent, uniform coatings which are superior for the uses mentioned above.

The compounds which are admixed with the arylene sulfide polymers in preparing the coatings are oxides or sulfides of cobalt or molybdenum. Illustrative of the materials are cobaltous oxide, cobaltic oxide, cobalto-cobaltic oxide, cobaltous sulfide, cobaltic sulfide, cobalt disulfide, cobalto-cobaltic sulfide, molybdenum sesquioxide, molybdenum dioxide, molybdenum trioxide, molybdenum pentoxide, molybdenum sesquioxide, molybdenum disulfide, molybdenum trisulfide, molybdenum tetrasulfide, molybdenum pentasulfide trihydrate, and the like. The amount of the cobalt or molybdenum oxide or sulfide is in the range of 0.5 to 50 weight percent, preferably 3–40 weight percent, more preferably 6–30 weight percent, based on the total weight of the poly(arylene sulfide) and metal-containing compound. These compounds can be admixed with the arylene sulfide polymers in any manner, preferably by mixing together the powders of the two materials.

Although the coating preferably is applied in the form of a slurry, it can be applied by other known techniques such as in the form of a powder, e.g., by dusting or by a fluidized bed process or the like. When a slurry is employed, any liquid can be used as the diluent provided the liquid is inert to the other components of the slurry and to the substrate, and provided it is readily volatilized prior to or during the subsequent heating or curing step. The diluents presently preferred are water and ethylene glycol. Other diluents which can be used include alcohols such as methyl alcohol, ethyl alcohol, and isopropyl alcohol, and hydrocarbons such as benzene, toluene, heptane, cyclohexane, and various hydrocarbon mixtures such as kerosene, diesel fuel, and the like. Less preferred diluents which can be used include chlorinated biphenyl, dimethyl phthalate, and the like. Mixtures of the diluents can be used.

Although the slurry can be applied to the substrate without prior heat treatment of the substrate, preferably the substrate is heated to a temperature of at least 400° F., more preferably about 600–800° F., prior to application of the coating. Most desirably, the slurry is applied to the substrate maintained at a temperature high enough to fuse the polymer on contact.

The particle size of the polymer can vary considerably and the most desirable particle size for a particular application can be easily determined in a relatively few trials. This can vary from the finest powders available up to about 10,000 microns in particle size. Good results can be obtained with the polymer in a particle size of about 3 to 30 microns, although the invention can be satisfactorily practiced with polymers of particle size outside this range.

The concentration of the polymer in the carrier liquid depends upon the coating application and whether or not additional solids are employed. As a practical matter, the slurry should not be so dilute that the polymer particles are not closely enough associated on deposit on the surface to permit them to fuse together on melting. On the other hand, the thickness of the slurry and its ease of application will impose a practical upper limit on the solids concentration. Generally a solids content of about 10 to 60 weight percent can be used and best results are obtained with a slurry that contains about 25 to 50 weight percent solids based on the weight of the total slurry. In addition to the polymer and oxide or sulfide of cobalt or molybdenum, other materials can be incorporated into the slurry, such as surfactants, fillers, pigments and similar coloring agents, and the like.

Any surface that can be heated to the coating temperature necessary to fuse the polymer can be coated with the procedure of this invention. In general, the articles which are coated are those in which the surfaces are formed of thermally stable polymeric materials or substances such as metal, glass, ceramic or stone. Preferably, metals such as aluminum, iron, iron alloys, steel, titanium, chromium, and the like are used. Preparation of the surface to be coated need only include a suitable cleaning to remove the scale, dirt and grease.

After the coating has been applied and the polymer fused, it is desirable to cure the coating by continued heating at an elevated temperature, preferably in the range of about 500 to 900° F. in an oxygen-containing atmosphere, such as air, for about 5 minutes to 24 hours or more. The thickness of the coating can be increased by additional applications following the same procedure after each curing period. Coating thicknesses of about 0.5 to 50 mils can easily be applied. Coatings having thicknesses of about 1 to 30 mils are satisfactory for most uses. The slurry can be applied by any procedure such as by spraying the slurry onto the heated surface or flowing the slurry over the hot article, preferably while providing for escape of the vaporized solvent.

EXAMPLE I

Cobaltic oxide was compared with titanium dioxide as a filler for a poly(phenylene sulfide) coating on steel.

A thick slurry comprising cobaltic oxide was prepared by adding water to a stirred mixture of 75 grams of poly(p-phenylene sulfide) (non-crosslinked product having an inherent viscosity in 1-chloronaphthalene of 0.16 at 206° C.), 25 grams of cobaltic oxide, and 0.5 gram of a surface active agent (Triton X–100 [1]). Another slurry was prepared in like manner except that titanium dioxide (rutile) was used instead of cobaltic oxide. Each of the slurries was sprayed on a hot steel test slug ½ inch in diameter and 4 inches long, a different slug being used for each slurry. Three coats of slurry were applied to each hot test slug, the coatings being baked 30 minutes at 700° F. after each coating.

The coated slugs were then placed, in a vertical position, in a rack in an autoclave. The bottom third of each of the slugs was immersed in water, the center third of each slug was surrounded by a 1:1, by volume, solution of toluene and kerosene, and the upper third of each slug was left in the gaseous phase. The closed autoclave was heated to 350° F. and pressured to 10,000 p.s.i.g. with carbon dioxide for 40 hours. The autoclave was then cooled, the pressure was released, and the slugs were removed.

To test the adhesion of the coating on each of the slugs, a cut parallel to the length of the slug was made on each of the three sections of the slug with the back of a scalpel blade point. The scalpel was then turned over, the blade was placed in the cut, and an attempt was made to pry the coating from the slug. Evaluation of the adhesion of the coating to the substrate was made on the following basis: Rating A—all intact; B—remove little coating; C—with some difficulty remove large segment; D—remove large segment with contour present; E—all pops off. On this basis the coating prepared through the use of cobaltic oxide rated A for each of the three sections exposed to the water, hydrocarbon, or gas phase during the test. In contrast, the coating prepared through the use of titanium dioxide rated B for each of the two sections exposed to the hydrocarbon or gas phase, and the coating rated D, with large blisters present, for the section exposed to the water phase.

Thus, the coating obtained through the use of cobaltic oxide was superior to that obtained when titanium dioxide was employed.

EXAMPLE II

Molybdenum disulfide was compared with titanium dioxide as a filler for a poly(phenylene sulfide) coating on steel.

A slurry comprising molybdenum disulfide was prepared by adding water to a stirred mixture of 75 grams of poly(p-phenylene sulfide) (non-crosslinked product having an inherent viscosity in 1-chloronaphthalene of 0.5 to 206° C.), 25 grams of finely divided molybdenum disulfide, and 1 gram of surface active agent (Triton X–100 [2]). Another slurry was prepared in like manner except that titanium dioxide (rutile) was used instead of molybdenum disulfide. Each of the slurries was applied to a hot steel test slug as described in Example I. The resulting thrice coated slugs were subjected to the test conditions described in Example I, after which the coatings were evaluated.

The coating prepared through the use of molybdenum disulfide rated A for each of the three sections exposed to the water, hydrocarbon, or gas phase during the test. In contrast, the coating prepared through the use of titanium dioxide rated B for each of the two sections exposed to the hydrocarbon or gas phase, and the coating rated E for the section exposed to the water phase.

As will be apparent to those skilled in the art, various modifications can be made in this invention without departing from the spirit or scope thereof.

We claim:

1. A coating composition comprising arylene sulfide polymer having a melting point above 400° F. and a metal-containing compound selected from the group consisting of at least one of an oxide or sulfide of cobalt or molybdenum, said metal-containing compound being present in an amount between 0.5 and 50 weight percent based on the total weight of said arylene sulfide polymer and said metal-containing compound.

2. The composition of claim 1 containing 6 to 30 weight percent based on the total weight of said composition of said metal-containing compound.

3. The composition of claim 1 wherein said metal-containing compound is cobaltic oxide.

4. The composition of claim 1 wherein said metal-containing compound is molybdenum disulfide.

5. The composition of claim 1 wherein said arylene sulfide polymer is poly(phenylene sulfide).

6. The composition of claim 5 wherein said poly(phenylene sulfide) has an inherent viscosity of at least 0.1.

7. The composition according to claim 6 wherein said metal-containing compound is cobaltic oxide.

8. The composition according to claim 6 wherein said metal-containing compound is molybdenum disulfide.

---

[1] Trademark for a condensation product of t-octylphenol and ethylene oxide having an average of about 9 to 10 ethylene-oxy units per molecule.

[2] Same as footnote 1 in Example I.

(References on following page)

References Cited

UNITED STATES PATENTS

| | | | |
|---|---|---|---|
| 3,487,052 | 12/1969 | Millen et al. | 260—79 |
| 3,520,854 | 7/1970 | Warner | 260—79 |
| 3,652,327 | 3/1972 | Hill, Jr., et al. | 117—123 D |

DONALD E. CZAJA, Primary Examiner

M. I. MARQUIS, Assistant Examiner

U.S. Cl. X.R.

117—123 D, 124 E, 132 B, 161 R; 260—29.2 R, 31.2 R, 33.4 R, 33.6 R, 37 R, 45.7 S, 45.75 R, 79.1